(12) United States Patent
Jensen et al.

(10) Patent No.: US 6,587,937 B1
(45) Date of Patent: Jul. 1, 2003

(54) MULTIPLE VIRTUAL MACHINE SYSTEM WITH EFFICIENT CACHE MEMORY DESIGN

(75) Inventors: David W. Jensen, Cedar Rapids, IA (US); Steven E. Koenck, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 09/540,345

(22) Filed: Mar. 31, 2000

(51) Int. Cl.$^7$ .............................. G06F 12/00
(52) U.S. Cl. .................. 711/173; 711/119; 711/121; 711/129
(58) Field of Search ................ 711/173, 121, 711/119, 129; 709/1, 108; 710/260

(56) References Cited

U.S. PATENT DOCUMENTS

| | | | | |
|---|---|---|---|---|
| 5,535,203 A | * | 7/1996 | Alatalo et al. | 370/378 |
| 5,555,245 A | * | 9/1996 | Alatalo et al. | 370/375 |
| 5,570,358 A | * | 10/1996 | Alatalo et al. | 370/378 |
| 5,627,992 A | * | 5/1997 | Baror | 711/133 |
| 5,787,490 A | * | 7/1998 | Ozawa | 709/103 |
| 5,875,464 A | * | 2/1999 | Kirk | 711/129 |
| 6,014,728 A | * | 1/2000 | Baror | 711/133 |
| 6,026,471 A | * | 2/2000 | Goodnow et al. | 711/137 |
| 6,295,580 B1 | * | 9/2001 | Sturges et al. | 711/129 |
| 6,317,872 B1 | * | 11/2001 | Gee et al. | 717/152 |
| 6,374,286 B1 | * | 4/2002 | Gee et al. | 709/1 |
| 6,438,677 B1 | * | 8/2002 | Chaudhry et al. | 709/106 |

OTHER PUBLICATIONS

Kirk, "Process Dependent Static Cache Partitioning for Real–Time Systems," pp 181–190, IEEE, 1988.*
Dahlgren et al., "On Reconfigurable On–Chip Data Caches," pp 189–198, ACM, 1991.*
Liedtke et al., "OS–Controlled Cache Predictability for Real–Time Systems," pp 213–223, IEEE, 1997.*

* cited by examiner

*Primary Examiner*—Matthew Kim
*Assistant Examiner*—Stephen Elmore
(74) *Attorney, Agent, or Firm*—Nathan O. Jensen; Kyle Eppele (57) ABSTRACT

A multiple virtual machine system with a microprocessor for executing instructions and issuing memory reads and writes to a current partition of a plurality of partitions. The multiple virtual machine may contain a partition management unit for receiving the memory reads and writes from the microprocessor for the current partition. A current partition cache is selected by the partition management unit for the current partition to receive the current partition memory reads and writes from the partition management unit. The current partition cache resolves memory read hits and misses. A next partition cache is selected by the partition management unit when the next partition becomes active on the microprocessor to receive next partition memory reads and writes from the microprocessor. An external memory containing data organized in frame blocks and containing cache block addresses for the plurality of partitions provides data to the microprocessor when the current partition cache resolves the memory miss, and provides appropriate frame block data to the next partition cache to restore the next partition cache to a previous state.

19 Claims, 5 Drawing Sheets

MULTIPLE VIRTUAL MACHINE SYSTEM WITH EFFICIENT CACHE MEMORY DESIGN

BACKGROUND OF THE INVENTION

This invention relates to computers, microprocessors, and more specifically to a multiple virtual machine system employing partitioning with an efficient cache memory design.

Microprocessors are widely used in many embedded processor applications. The many different embedded applications require varying degrees of performance and cost. For example low-cost low-power processors are required for portable applications with the central processing unit and other components forming a system-on-a-chip. Commercial processors are available for these applications. Low-cost commercial processors are used in consumer products such as appliances, entertainment systems, automobiles, etc.

Military and commercial avionics and communications systems require microprocessors for embedded applications with much higher performance and reliability. Microprocessors are required with a verifiable hardware design and with features such as built-in-test and monitoring capabilities for mission critical systems. To meet the requirements of these mission critical systems, commercial processors need to be investigated and custom microprocessors need to be developed. Approaches are needed that provide system-on-chip solutions, support high reliability, and provide for function partitioning and reconfiguration.

Currently one computer system is used for each unique function in avionics and communications equipment such as autopilots, flight management systems, and displays. The avionics computer systems offer only limited inter-functional dependencies in that they exchange sensor and control data. This computer system architecture provides strong functional isolation needed for critical avionics systems. Avionics systems typically must be certified to meet reliability standards established by regulatory agencies such as the Federal Aviation Administration. System certification involves verifying that all system components work properly together.

In order to reduce hardware costs involved with commercial and custom high performance microprocessors, it may be beneficial to provide one computer system to perform many distinct functions in avionics, communications, and other equipment. Having one computer system may substantially reduce certification costs in avionics systems. System functions are certified once, independently, and to the level appropriate to their criticality while a composition of functions retains individual certification.

Many different functions can be performed on one computer system by using virtual machines. A virtual machine is a platform-independent instruction set that allows a user a portable programming environment. Multiple virtual machines can run on a single physical processor through sharing or partitioning of the physical processor operation. The multiple virtual machines perform as if they were separate physical machines operating on one processor. A well-known virtual machine is the JAVA virtual machine.

With one computer system the avionics functions are no longer physically isolated. Interaction of functions must be considered without the physical isolation. Partitioning of functions provides the necessary isolation for safety critical avionics applications such that each function is guaranteed not to be affected by the operation of any other function.

Partitioning and multiple virtual machines are processing technologies that have applications to many areas including avionics and communications products. Partitioning and multiple virtual machines can provide direct cost advantages in software development. Multiple levels of certified software can co-exist on the same processor. Software can be certified once and re-used in multiple application environments. These advantages are possible with brick-walled partitioning provided with partition management and with deterministic execution. Efficient techniques to provide deterministic behavior with on-chip cache have not been developed. What is needed is an approach to provide deterministic execution that does not significantly increase the required cache size and is independent of the number of partitions or virtual machines.

SUMMARY OF THE INVENTION

A multiple virtual machine computer system comprising an efficient cache design is disclosed. In one embodiment of the invention the multiple virtual machine computer system comprises a microprocessor that executes instructions for one of a plurality of partitions operating on the multiple virtual machine. The microprocessor issues memory reads and writes for a current partition to a partition management unit. The partition management unit selects a current partition cache for the current partition to receive the current partition memory reads and writes from the partition management unit and to resolve memory read hits and memory misses. The partition management unit selects a next partition cache when the next partition becomes active to receive next partition memory reads and writes from the microprocessor. An external memory contains data organized in frame blocks and contains cache block addresses for the plurality of partitions. The external memory provides data to the microprocessor when the current partition cache resolves the memory misses. The external memory provides appropriate frame block data to the next partition cache when the current partition cache is active by cycle stealing or using spare cycles from the current partition to restore the next partition cache to a previous state. The next partition cache may also be restored to a previous state during a gap of time while switching from the current partition to the next partition. Two or three cache memories may be employed in the present invention. The cache memory storing and restoring and multiple virtual machine context switching may also be performed in software.

It is an object of the present invention to provide efficient support of high performance and deterministic behavior in multiple virtual machine microprocessor architectures.

It is an object of the present invention to provide an efficient cache design that is adaptable to cached microprocessor architectures.

It is a feature of the present invention to provide high-speed operation and deterministic behavior in a multiple virtual machine system with the addition of only two or three caches.

It is a feature of the present invention to be able to load caches using three different approaches.

It is an advantage of the present invention to be able to provide high-speed operation and deterministic behavior for multiple virtual machine applications in safety-critical avionics applications to reduce software certification costs.

BRIEF DESCRIPTION OF THE DRAWINGS

The invention may be more fully understood by reading the following description of the preferred embodiments of the invention in conjunction with the appended drawings wherein.

DETAILED DESCRIPTION

Figure 1:
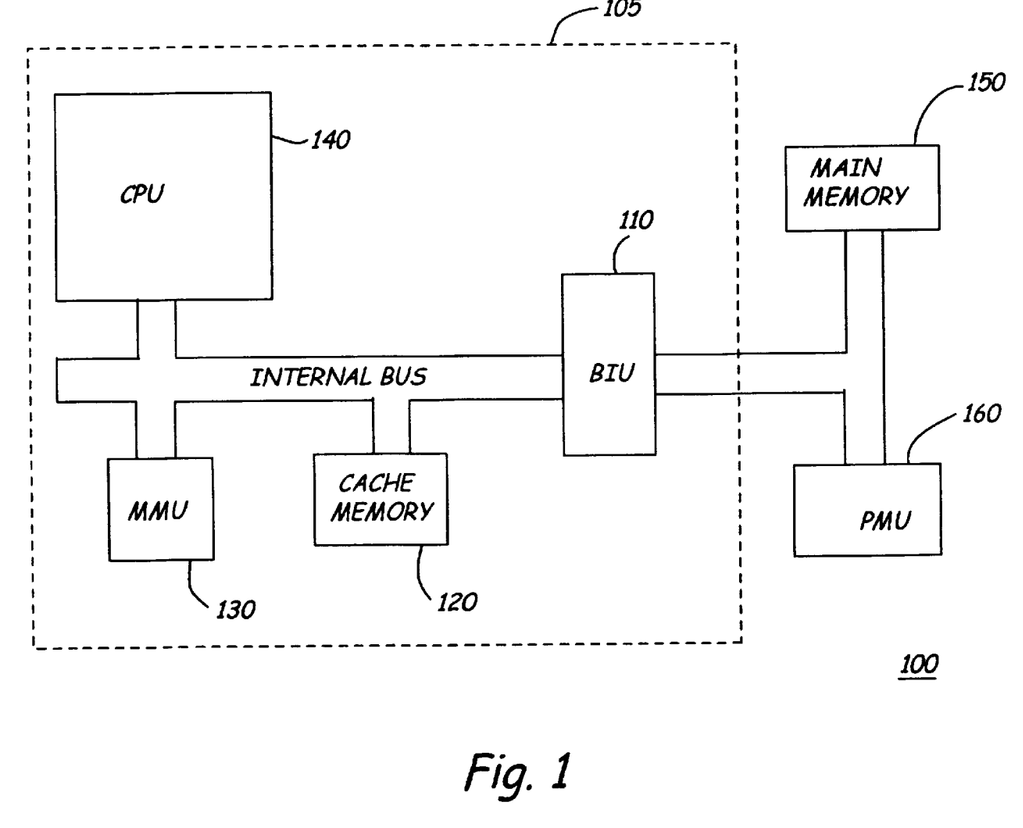
FIG. 1 is block diagram of a microprocessor computer system employing cache memory.

A computer system 100 is shown in block diagram form in FIG. 1. Included in the computer system 100 is a microprocessor 105 comprising a bus interface unit 110, on-chip cache memory 120, a memory management unit 130, and a central processing unit 140. A main memory 150 may be external to the microprocessor 105.

One computer system 100 as shown in FIG. 1 may be used for many distinct functions to reduce hardware costs if the computer is fast enough to perform all the processing tasks. Software in avionics and other safety-critical applications or security applications must be certified. Operating several software functions on one computer system can substantially reduce software certification costs for these applications if it can be shown that the software functions are isolated from each other. Software functions need to be certified once, independently, and only to the level appropriate to their critically.

Virtual machines can be operated on a computer system 100 as shown in FIG. 1 to perform many different functions. A virtual machine is a platform-independent instruction set that allows a user a portable programming environment. Multiple virtual machines can run on a single physical processor through sharing or partitioning of the physical processor operation.

When multiple virtual machines are operating on a single processor, each virtual machine has its own operating time. There must be isolation between the multiple virtual machines to avoid interaction between them. Partitioning is isolating the two or more virtual machines running on a physical processor to an acceptable degree. The isolation between the multiple virtual machines must be both in space and time. To obtain temporal isolation periodic partition switching of the virtual machines is employed. Each virtual machine operates in its own time slot or partition. To obtain spatial isolation, memory read/write protection must be provided between the partitions.

Figure 2:
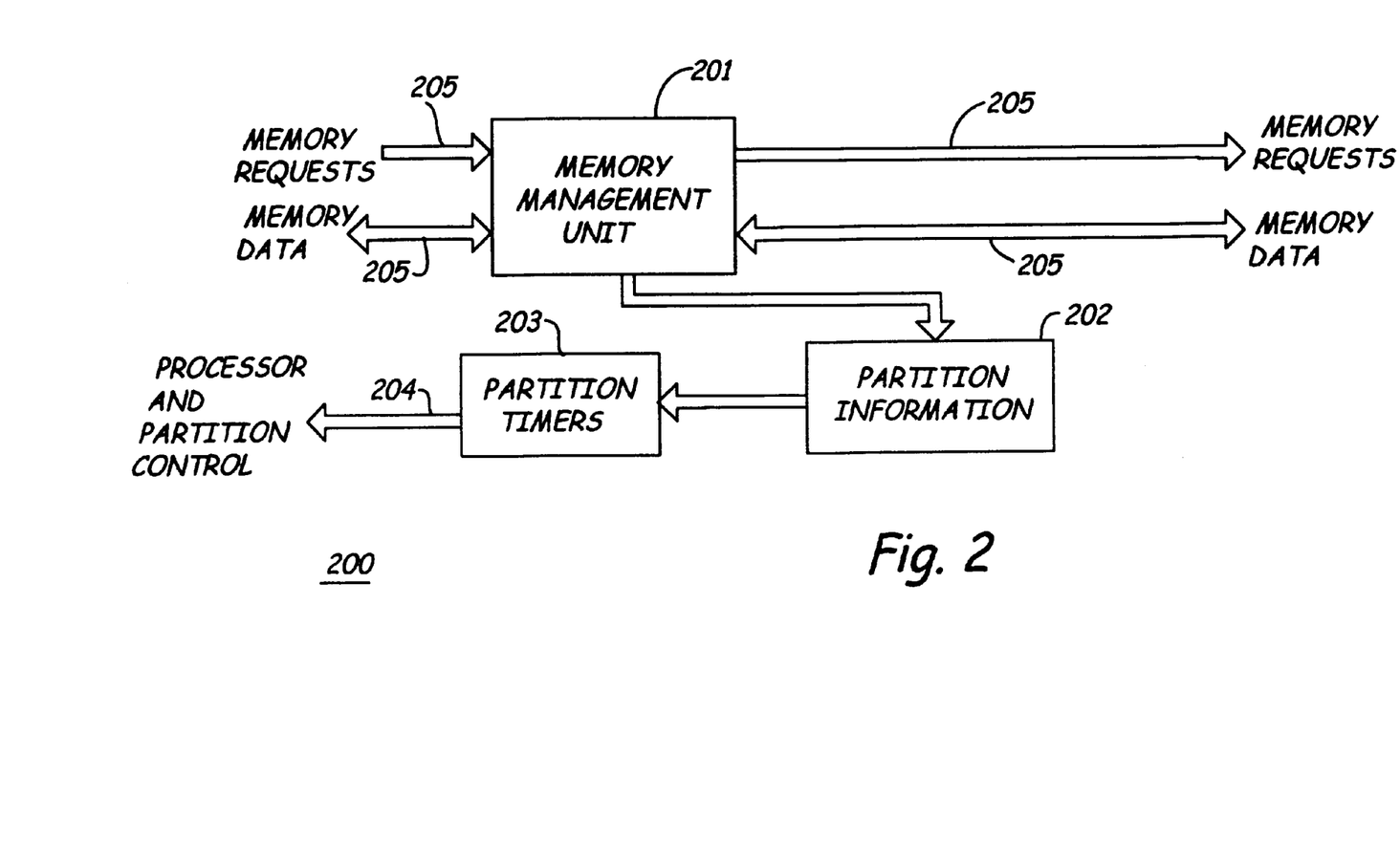
FIG. 2 is a block diagram of a partition management unit.

A partition management unit (PMU) 160 may be added to the computer system 100 of FIG. 1 to maintain isolation between the multiple virtual machines and to enforce switching between the multiple virtual machines. By way of example, the PMU (160) can be implemented in hardware as a FPGA (field programmable gate array) or as an ASIC (application specific integrated circuit). In contrast, the functions of PMU 160 are typically created in software in most known operating systems and run time executives. An exemplary block diagram of a PMU 200 is shown in FIG. 2. The PMU 200 contains memory protection logic in form of a memory management unit 201 to enforce access rights for each virtual machine to its appropriate memory region. The memory protection logic contains the functionality of a conventional microprocessor memory management unit (MMU) known in the art. Interfaces to the MMU 201 include memory and data busses 205. The PMU 200 contains information that may be stored in a memory 202 for each partition or virtual machine in the system. This information provides address range values, execution time limits, and scheduling protocols. A partition timer 203 signals the microprocessor to perform a partition context switch and loads the new partition information from 202 into the MMU 201. A PMU may contain general-purpose timers (not shown), which may include delay timers, tick timers, and clock timers. Conventional microprocessor interfaces 204 may include resets, interrupts, and other signals to control partition context switching and to report memory range violations. The PMU 200 integrates the functionality of a MMU and operating system context switching in a single hardware design. This design provides assurance for proper access to memory (space) and proper virtual machine execution duration (time).

Safety-critical real time systems in avionics for example must respond to real-time events and therefore must be fast, provide low latency, and must be analyzable and deterministic, that is, they must operate the same way every time.

Cache memories are used in computers to provide considerable improvements in speed. A cache memory 120 is shown in FIG. 1. Data is read into a small cache memory 120 and then accessed from the cache at high speed instead of a large relatively slow main memory 150. The cache memory 120 may be part of the microprocessor 105 or a separate memory chip (not shown). Cache memories can be used with multiple virtual machines but spatial isolation between the partitions must be maintained.

There are several ways that may be used to manage the virtual machine/cache memory relationship to improve speed and maintain isolation between the multiple virtual machines. One approach is to always completely flush the cache memory before changing to a new virtual machine context. This approach is of particular interest to security applications that require that no artifacts of a particular segment of code or data is accessible accidentally to another. However flushing the cache significantly degrades performance and speed because the cache must be refilled from the relatively slow main memory.

Deterministic behavior is essential for a computer architecture to support avionics platforms. Deterministic behavior occurs when the processor execution can be predicted or predetermined at any time. With deterministic execution only one step follows another with no choices or alternates in the execution. Caching is essential for a high-performance microprocessor to obtain high-speed operation. The currently known ways of providing caching and deterministic behavior are to replicate the cache, i.e. provide a dedicated cache, for each virtual machine, or to flush the cache when changing to a new virtual machine. This is unreasonable for multiple virtual machines because of the required silicon chip real estate and the performance degradation.

Figure 3:
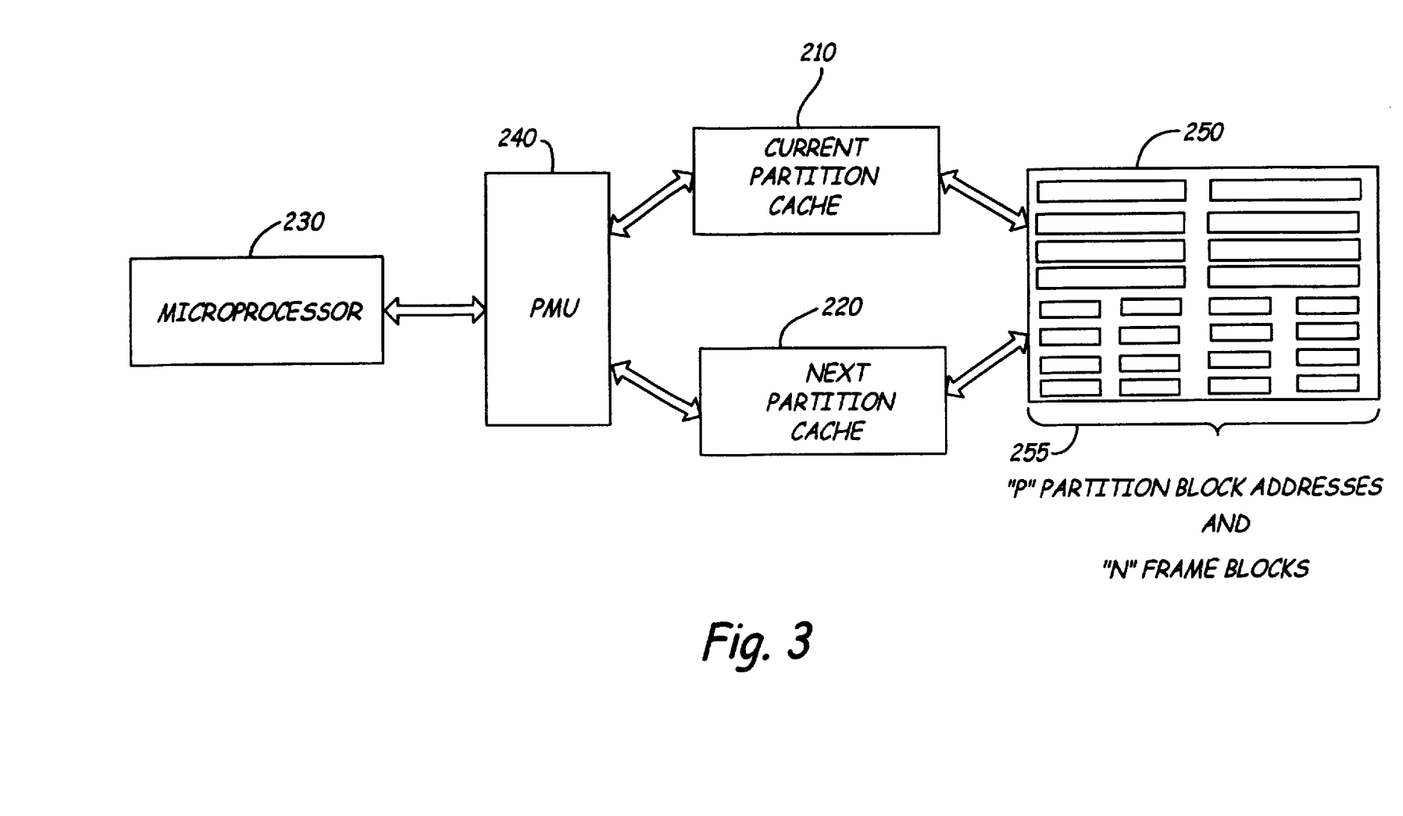
FIG. 3 is a block diagram showing a dual cache memory hardware approach for cache memory restoration in a multiple virtual machines system.

The approach to solving this problem in the present invention is to provide dual alternating caches. Shown in FIG. 3 are the key concepts of one embodiment of the invention. A current partition cache 210 is used for the currently active partition or virtual machine operating on microprocessor 230. A next partition cache 220 is used to restore the cache contents corresponding to the next partition when it becomes active. The current partition cache 210 and the next partition cache 220 of FIG. 3 may be on-chip cache memories as shown in FIG. 1 where cache 120 is duplicated or off-chip as shown in FIG. 3. The partition management unit 200 of FIG. 2 may be included as PMU 240 to provide the needed spatial isolation when the different virtual machines or partitions are operating by selecting the appropriate caches for the active partitions. This process incurs a minimal overhead that slightly degrades the current partition's performance. However this degradation is deterministic and restores the next partition cache 220 to the final state of the next partition at the end of its previous execution.

A premise of effective cache systems is that the speed of the caches (210 and 220 in FIG. 3) is much faster than a main external memory 250, which is viable with on-chip caches. Also the caches must be large enough that hit ratio (or percent of time that the desired data is in the cache) is high. The memory access patterns of the multiple virtual machine environment will tend to preclude a high hit ratio because each virtual machine will access separate regions of memory. The disparate accesses will tend to displace all the pertinent cache contents before a virtual machine is re-activated.

The multiple virtual machine structure does however have a very helpful characteristic. The next virtual machine to be executed can be predetermined. Typically virtual machines are scheduled round robin. Consequently it is possible to make sure that the next virtual machine's cache contents are restored prior to its activation. It is only necessary to maintain the cache frame block addresses for each of the partitions in the system. To accomplish the cache restoration a next cache would be retrieved or restored from such saved frame block addresses.

Figure 4:
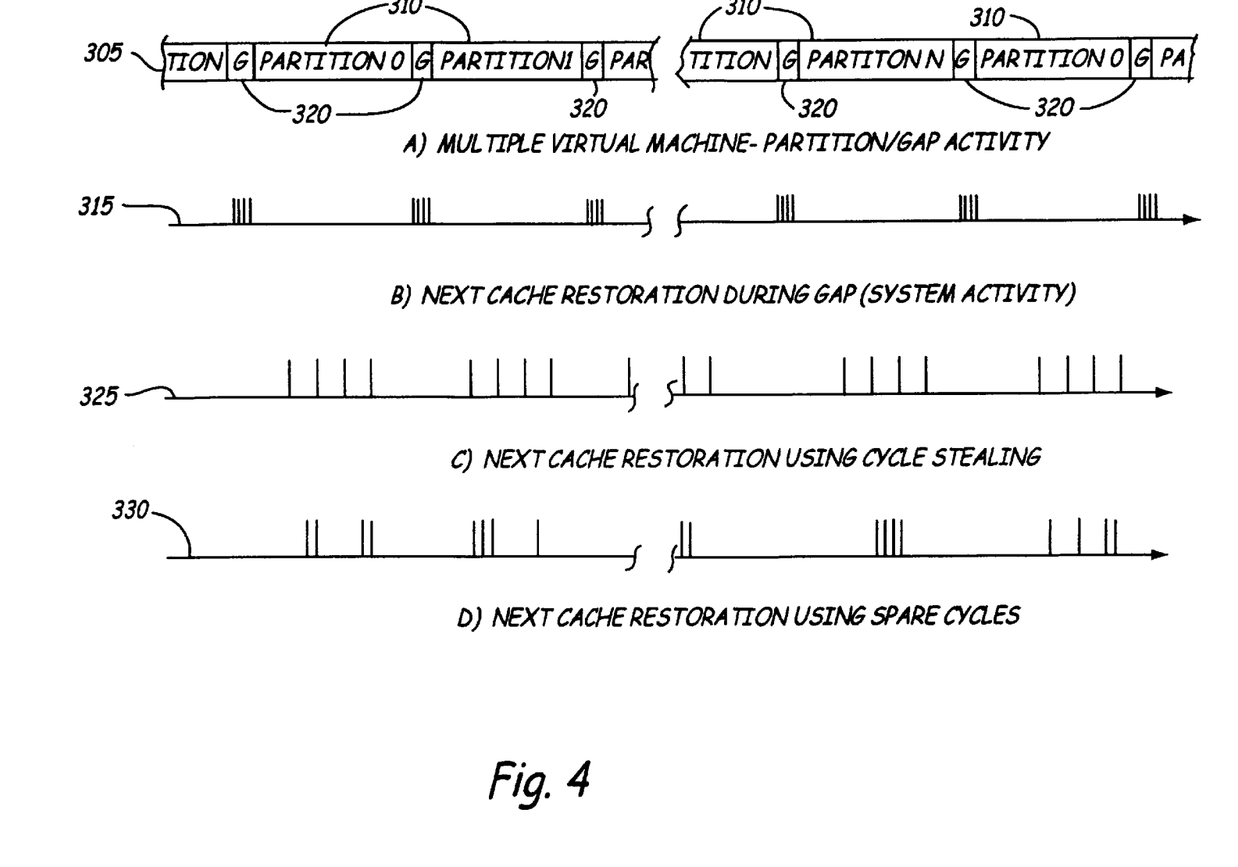
FIG. 4 shows alternate approaches to cache memory restoration activity in a multiple virtual machine system.

To accomplish this capability while still providing good cached performance, it is necessary to fill the next cache without consuming all of the current virtual machine's performance. Shown in FIG. 4 are several approaches to fill the next cache. In the first approach, system activity is performed between each partition execution 310 in a gap (G) 320 of time as shown by 305 in FIG. 4. The next cache filling operation could occur during this interval. Each vertical line in the graphs of 315, 325, and 330 of FIG. 4 represent the restoration of one of the frame blocks 255 from FIG. 3. Two other methods of cache filling are also shown: restoring the cache contents at predetermined cycles during the current partition's execution shown by 325 in FIG. 4 ("cycle stealing"); and using spare cycles when available during the current partition's execution shown by 330 in FIG. 4. The latter approach is not deterministic and might not be viable for avionics applications.

In FIG. 3 the microprocessor 230 executes instructions for one of P partitions. The microprocessor 230 issues memory reads and writes to the partition management unit (PMU) 240. The PMU 240 resolves all memory read and write accesses such that the virtual machine associated with a partition can access only its allowed memory space. The PMU 240 directs valid memory reads and writes to the current partition cache 210. When the next partition becomes active the PMU 240 swaps the roles of the current partition cache 210 and the next partition cache 220. The current partition cache 210 resolves memory read hits immediately and resolves read misses by reading external memory 250. Write through caching maintains coherency with the external memory 250. The next partition cache 220 may be active during the current partition execution. The external memory 250 contains data organized in frame blocks 255 and also contains cache block addresses 258 for the partitions active in the system. Without disrupting the current partition, the microprocessor, through PMU 240, reads appropriate frame blocks 255 from external memory 250 to the next partition cache 220. This can occur by cycle stealing from the current partition as shown by 325 in FIG. 4 or by using spare cycles from the current partition. Otherwise the next partition cache 220 may be restored during gaps 320 between partitions as shown by 305 in FIG. 4. This activity restores the next partition cache 220 to the previous state of the next partition to be active.

Although the multiple virtual machine system is described above with two caches, a third cache may be added to extend the concept and still remain within the scope of the present invention. In the embodiment of the invention described above, the current cache may be a first or second cache and the next cache may be second or first cache respectively. The third cache may be dedicated to servicing computer system activity. Graph 305 in FIG. 4 illustrates system activity in the gaps (G) 320 between multiple virtual machine partitions. The multiple virtual machine system may switch the current or second cache to the next cache or a first cache without impacting the contents of the third cache. This independence assures the performance and determinism of the system activity between the partitions. All other operations are similar to the two-cache system previously described.

Currently there is no clear solution to providing deterministic timing behavior in commercial microprocessor architectures because of the on-chip caches in the microprocessors as shown by 120 in FIG. 1. With commercial microprocessors and operating systems, a context switch occurs to change the current virtual machine or process. After each context switch in the microprocessor, there will be some non-deterministic cache misses as the new application begins to execute. This could be addressed by flushing the cache after each partition or context switch or by adding worst-case cache miss timings to the context switch. Flushing the cache seriously degrades the performance of the commercial microprocessor and using worst-case timing forces the system to be over designed.

Figure 5:
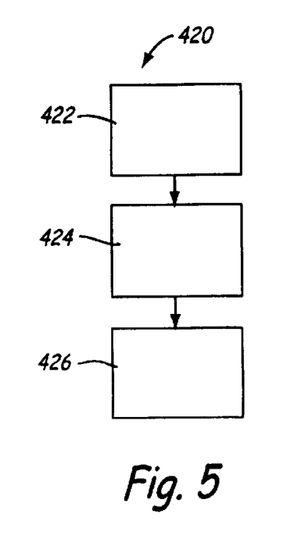
FIG. 5 is a flowchart showing a method of implementing an embodiment of the invention.

The same dual cache scheme of the present invention can also be implemented in software with the hardware partition management unit 240 of FIG. 3 being eliminated in another embodiment of the invention. An operating system of a microprocessor knows which virtual machine or process is going to be active next (see step 422 in the method 420 shown in FIG. 5). With that knowledge, the operating system can include a cache store and a cache restore as a part of the partition or context switch. As shown in FIG. 5, in step 424 the current cache state can be stored to memory, and in step 426 the next cache state can be restored from memory. This would completely eliminate one source of non-determinism from the context switch and application execution. Such determinism is essential for high-criticality multiple virtual machine avionics applications.

This deterministic cache storing and restoring technique is applicable to commercial microprocessor system designs, many of which offer instructions to load and store caches. The cache storing and restoring feature may be added to context-switch-OS-software of a commercial operating system. This would make the commercial system more deterministic and it would provide much better performance than cache flushing.

The cache storing and restoring feature may also provide better performance than allowing the system to naturally restore the cache for the newly loaded process or virtual machine through normal execution. Restoring the entire cache during the context or partition switch may be more efficient than reading individual lines of cache data from memory as the process or virtual machine begins to execute.

Because of limitations of commercial microprocessors, the cache restoration approach can only be accomplished between context or partition switches. This approach is illustrated by 315 in FIG. 4. This is a technique to maintain commercial microprocessor performance (enabled by the cache) without introducing non-deterministic behavior after context switches.

Figure 6:
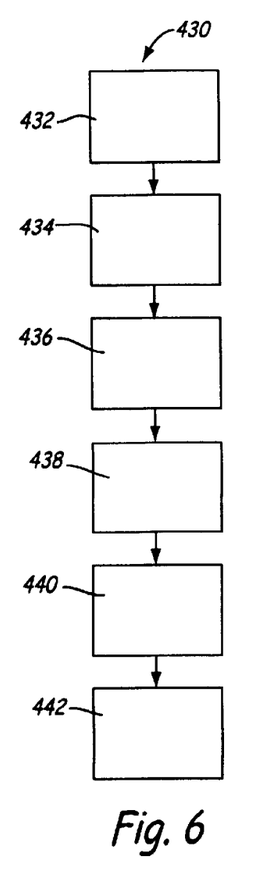
FIG. 6 is a flowchart showing a method of saving a state of a microprocessor (or it's virtual machine or process) that may be used with the invention.

There are a small and finite number of resources in a commercial microprocessor that defines its execution state. These resources must be saved and restored to provide deterministic program execution on microprocessors using caches. Nearly all processors use a program counter (PC) to contain the memory address of the current application instruction being executed. Registers and flags contain intermediate operation results and operation status. Modern microprocessors have added fast-access memory caches to improve system performance. These caches often hold recently accessed program instructions and data. Although every microprocessor and operating system will have a subtly different set of resources to save, it is instructive to outline a typical flowchart of the state saving operation. To save the state of a microprocessor (or its virtual machine or process), the following set of steps, as shown in the method 430 in FIG. 6, may be executed:

1) Interrupt current process (432);
2) Save current program counter (434);
3) Save microprocessor current cache(s) (436);
4) Save microprocessor registers (438);
5) Save microprocessor status flags (440); and
6) Save operating system context (442).

The content of the operating system context may be complex or trivial. On some workstation-based operating systems, it may be necessary to save many resources. Examples of these resources include file system information, semaphores, and device driver settings. On most embedded real time systems, only a few system addresses and registers may be saved.

Figure 7:
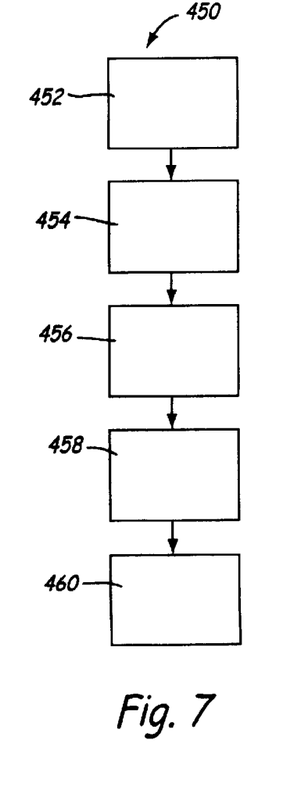
FIG. 7 is a flowchart showing a method of restoring a state of a microprocessor (or it's virtual machine or process) that may be used with the invention.

Having saved the current process application or virtual machine state, the operating system may then restore a previously saved process state. The restoration may typically be the reverse of the state saving operation. Again, although every microprocessor and operating system will have a subtly different set of resources to restore, it is instructive to outline a typical flowchart of the state restoring operation. To restore the state of a microprocessor (or its virtual machine or process), the following set of steps, as shown in the method 450 in FIG. 7, may be executed:

1) Restore operating system context (452);
2) Restore microprocessor status flags (454);
3) Restore microprocessor registers (456);
4) Restore microprocessor next cache (458); and
5) Restore current program counter (460).

It is believed that the multiple virtual machine computer system employing efficient cache design of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A computer system comprising:
    a microprocessor for executing instructions and issuing memory reads and writes for a current partition of a plurality of partitions;
    a partition management unit for receiving the memory reads and writes from the microprocessor for the current partition;
    a current partition cache selected by the partition management unit for the current partition to receive the current partition memory reads and writes from the partition management unit and for resolving a memory read hit and a memory miss;
    a next partition cache selected by the partition management unit when the next partition becomes active on the microprocessor to receive next partition memory reads and writes from the microprocessor; and
    an external memory containing data organized in frame blocks and containing cache block addresses for the plurality of partitions, for providing data to the microprocessor when the current partition cache resolves the memory miss, and for providing appropriate frame block data to the next partition cache to restore the next partition cache to a previous state.

2. The computer system of claim 1 wherein the next partition cache is restored to the previous state during a gap in time when switching from the current partition to the next partition.

3. The computer system of claim 2 further comprising a third partition cache for dedicated servicing of computer system activity during the gap in time.

4. The computer system of claim 1 wherein the next partition cache is restored to the previous state during current partition operation by using stolen current partition cycles.

5. The computer system of claim 1 wherein the next partition cache is restored to the previous state during current partition operation by using spare current partition cycles.

6. The computer system of claim 1 wherein the current partition cache is a first partition cache and the next partition cache is a second partition cache.

7. A computer system comprising:
    a processor for issuing memory read and writes for a current partition of a plurality of partitions;
    a current partition cache to receive the current partition memory reads and writes and for resolving a memory read hit and a memory miss;
    a next partition cache selected when the next partition becomes active on the processor to receive next partition memory reads and writes from the processor; and
    an external memory for providing data to the processor when the current partition cache resolves the memory miss, and for providing appropriate data to the next partition cache to restore the next partition cache to a previous state.

8. The computer system of claim 7 further comprising a partition management unit for receiving the memory reads and writes from the microprocessor for the current partition, for selecting the current partition cache to receive the current memory reads and writes, and for selecting the next partition cache when the next partition becomes active.

9. The computer system of claim 7 wherein the external memory is organized in frame blocks and contains cache block addresses for the plurality of partitions.

10. A computer system comprising:
- a microprocessor for issuing memory reads and writes for a current virtual machine of a plurality of virtual machines operating on the microprocessor;
- a partition management unit for selecting the current virtual machine and for resolving memory read and write accesses;
- a current partition cache selected by the partition management unit for the current virtual machine to receive the current virtual machine memory reads and writes from the microprocessor and for resolving a memory read hit and a memory miss;
- a next partition cache selected by the partition management unit when the next virtual machine becomes active on the microprocessor to receive next partition memory reads and writes from the microprocessor; and
- an external memory for providing data to the microprocessor when the current partition cache resolves the memory miss and for providing appropriate data to the next partition cache to restore the next partition cache to a previous state.

11. The computer system of claim 10 wherein the external memory is organized in frame blocks and contains cache block addresses for the plurality of virtual machines.

12. A method of caching in a computer system in which a plurality of virtual machines are established, comprising the steps of:
- executing instructions in a microprocessor for a current partition of a plurality of partitions;
- issuing memory read and write instructions from the microprocessor to a partition management unit for the current partition;
- directing valid memory reads and writes to a current partition cache by the partition management unit;
- resolving memory reads in the current partition cache;
- resolving memory misses by reading an external memory to the current partition cache;
- reading appropriate frame blocks from the external memory to a next partition cache to restore the next partition cache to a previous state of a next partition to be active; and
- switching the current partition cache to the next partition cache when the next partition becomes active after a gap in time in switching from the current partition to the next partition.

13. The method of claim 12 wherein the step of reading the appropriate frame blocks from the external memory to the next partition cache to restore the next partition cache is performed when the gap in time exists during switching from the current partition to the next partition.

14. The method of claim 12 wherein the step of reading the appropriate frame blocks from the external memory to the next partition cache to restore the next partition cache is performed during current partition execution by current partition cycle stealing.

15. The method of claim 12 wherein the step of reading the appropriate frame blocks from external memory to the next partition cache to restore the next partition cache is performed during current partition execution by using spare current partition cycles.

16. A method of caching in a computer system in which a plurality of virtual machines are established, comprising the steps of:
- executing instructions in a microprocessor for a current partition of a plurality of partitions;
- issuing memory read and write instructions from the microprocessor to a current partition cache;
- resolving memory reads in the current partition cache;
- resolving memory misses by reading an external memory to the current partition cache;
- reading appropriate data from the external memory to a next partition cache to restore the next partition cache to a previous state of a next partition to be active; and
- switching the current partition cache to the next partition cache when the next partition becomes active after a gap of time.

17. A method of cache memory switching in a multiple process microprocessor system wherein an operating system of a microprocessor performs the steps comprising:
- determining which process is going to be an active next process;
- storing a current cache and a current microprocessor state for a current process to a memory during a context switch; and
- restoring a next cache and a next microprocessor state for the next process from the memory during the context switch.

18. The method of claim 17 wherein the step of storing a current cache and a current microprocessor state further comprises:
- interrupting the current process;
- saving a current program counter;
- saving the microprocessor current cache;
- saving microprocessor registers;
- saving microprocessor status flags; and
- saving operating system context.

19. The method of claim 17 wherein the step of restoring the next cache and the next microprocessor state further comprises:
- restoring operating system context;
- restoring microprocessor status flags;
- restoring microprocessor registers;
- restoring the microprocessor next cache; and
- restoring a current program counter.

* * * * *